Figure 1:
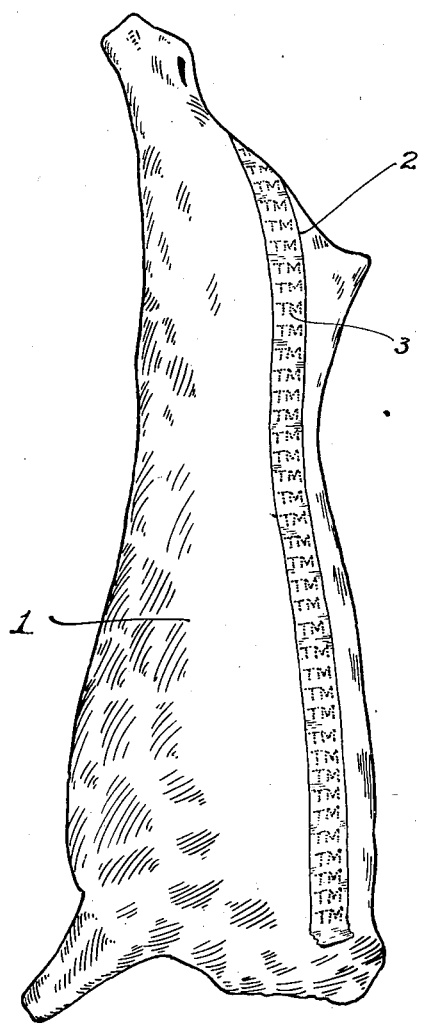

June 15, 1937.   B. E. WILLIAMS   2,083,765
MEAT BRANDING
Filed Jan. 31, 1936

WITNESS-
Wm C. Meiser

Beverly E. Williams
INVENTOR

BY Tory W. Johns
ATTORNEY

Patented June 15, 1937

2,083,765

UNITED STATES PATENT OFFICE 2,083,765

MEAT BRANDING

Beverly E. Williams, Chicago, Ill., assignor to Industrial Patents Corporation, Chicago, Ill., a corporation of Delaware Application January 31, 1936, Serial No. 61,800

5 Claims. (Cl. 216—62)

This invention relates to a method of branding carcass meat and to meat products branded in accordance with the method.

The invention is concerned with branding edible carcasses, or major portions thereof, after the hide or pelt has been removed, and is particularly adapted for use in branding beef and sheep carcasses.

One of the objects of the invention is to provide a method of branding such carcasses, or major portions thereof, by affixing a brand mark in such a manner that it may be readily removed without altering or otherwise affecting the appearance of the meat, and yet which will remain affixed until it is desired to remove the mark.

Another object of the invention is to provide a carcass, or a major portion thereof, which will display a trade-mark or other indicia of quality or origin in such a manner that the mark will appear on the carcass or major portion thereof or on ultimate consumer cuts.

In the drawing similar reference characters in the several figures indicate similar elements.

Figure 1 is a view of a side of dressed beef 1 from which the hide has been removed to which is affixed a strip or band 2 bearing a plurality of indicia 3.

Figure 2:
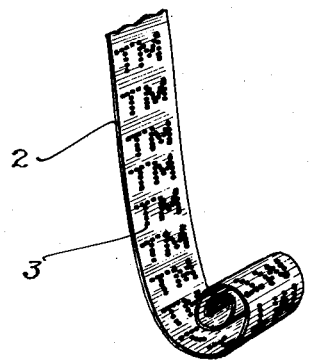

Figure 2 is a perspective view of band 2 partially applied to the surface of carcass 1.

I have found that there is present on the surface of a freshly skinned animal a gelatinous serum which quickly sets up. The present invention contemplates printing in repeated succession a brand mark or other indicia on a strip of transparent cellulosic material. A satisfactory material is substantially pure transparent cellulosic paper, 0.00088 inch in thickness, which has received no moisture proofing treatment, though it has been treated with glycerine to render it flexible. As is well known, this material is commonly termed regenerated cellulose.

The printed strip is applied flat to the surface of the carcass, such as a carcass of beef, and after application presents the appearance shown in Figure 1. The strip is applied so that the indicia are arranged in successive order, transversely of the lines on which the meat is customarily cut. For best results, the strip of cellulosic material should be applied to the carcass immediately after skinning; in any event, it must be applied before the gelatinous serum has coagulated.

In the case of beef and hot skinned calves the strip is applied in practice on the killing floor immediately after skinning. In the case of cold skinned calves, that is, calves that are skinned in the cooler twenty-four hours or longer after slaughter, the strip is applied immediately after the removal of the skin. The strip may be applied in any suitable manner but is preferably unrolled from a roll of strip material and is pressed flat against the surface of the carcass.

The gelatinous serum present on the surface of the carcass coagulates shortly after skinning and provides an effective natural adhesive. Due to the presence of fats on the surface of carcasses, known adhesives have been found ineffective for affixing labels and the like to the surface of carcasses and consequently the practice has grown up in recent years of branding carcass meat with ink brands of various types. These ink brands are objectionable to certain classes of trade because it involves direct printing on a food product. It has, of course, been proposed to wrap pieces of meat in a pre-printed wrapping material. The present invention is not concerned with such procedures.

I have found that a strip of cellulosic material applied to the surface of the carcass after the skin has been removed in accordance with the present invention gives an effective adhesion, which is permanent in the sense that it will withstand ordinary handling until it is purposely removed.

It will be seen that the present invention provides a branded meat product comprising a carcass or major portion thereof having a brand attractively repeated. The strip offers no effective resistance to the division of the carcass into consumer cuts, and consequently, steaks and roasts cut from a carcass so printed will bear on the outer edge the desired brand mark which the butcher need not remove and which need not be cut off with a consequent loss of product. The customer may readily remove the brand without affecting the product, since although the gelatinous serum after coagulation is adequately adhesive for the purposes of the present invention, the strip may be removed with facility.

I claim:

1. The method of marking edible carcasses from which the hide or skin has been removed which consists in applying thereto immediately after the hide or skin has been removed, a strip of regenerated cellulose bearing identifying marks.

2. The method of marking edible carcasses from which the hide or skin has been removed which consists in applying thereto immediately after the hide or skin has been removed, a strip of regenerated cellulose bearing a plurality of like identifying marks arranged in successive order, transversely of the lines on which the meat is customarily cut, substantially as and for the purpose described.

3. The method of marking meat which consists in applying to the surface thereof after the hide or skin has been removed, but before the gelatinous serum naturally present on the surface of the meat has coagulated, a strip of cellulosic material bearing identifying marks.

4. The method of branding edible carcasses which comprises removably affixing to the surface thereof, by the gelatinous serum naturally present on the surface of the meat, a strip of regenerated cellulose bearing identifying marks.

5. An edible carcass or part thereof having transparent cellulose affixed to the surface thereof by serum naturally present on the meat which has coagulated in contact with the carcass surface and with the transparent cellulose.

BEVERLY E. WILLIAMS.